Patented Oct. 6, 1925.

1,556,329

UNITED STATES PATENT OFFICE.

OSKAR KALTWASSER, OF BERLIN, HERMANN KIRCHHOFF, OF BERLIN-LICHTERFELDE, AND HANS OEHRN, OF CHARLOTTENBURG, GERMANY, ASSIGNORS TO ACTIEN GESELLSCHAFT FÜR ANILIN FABRIKATION, OF BERLIN, GERMANY.

NEW ORTHO-HYDROXYAZO DYE.

No Drawing.   Application filed May 15, 1925. Serial No. 30,616.

*To all whom it may concern:*

Be it known that we, (1) OSKAR KALTWASSER, (2) HERMANN KIRCHHOFF, and (3) HANS OEHRN, citizens of the German Republic, residing at (1) Berlin, Germany, (2) Berlin-Lichterfelde, Germany, and (3) Mommsenstr. 13, Charlottenburg, Germany, have invented certain new and useful Improvements in New Ortho-Hydroxyazo Dyes, of which the following is a specification.

According to this invention by combining a sulphonated ortho-hydroxydiazo compound with an unsulphonated 1-naphthyl-3-methyl-5-pyrazolone dyestuffs are obtained which are very valuable for dyeing wool. The after-chromed tints or those obtained by dyeing in the presence of a chrome-mordant have an excellent fastness to the action of light and to stoving.

The following examples illustrate the invention but without limiting it, the parts being by weight:

1. 22.6 parts of 1-β-naphthyl-3-methyl-5-pyrazolone are suspended in 225 parts of water. At a temperature of 3–5° C. the diazo-compound prepared in the usual manner from 23.5 parts of 2-amino-4-nitro-1-hydroxybenzene-6-sulphonic acid is added. After addition of 5.3 parts of calcined sodium carbonate the whole is stirred for 6 to 8 hours. The dyestuff is thus obtained for the greater part in the form of a precipitate. It is finished in the usual manner. It dyes wool in the presence of chromium mordants orange tints. The dyestuff has probably the formula:

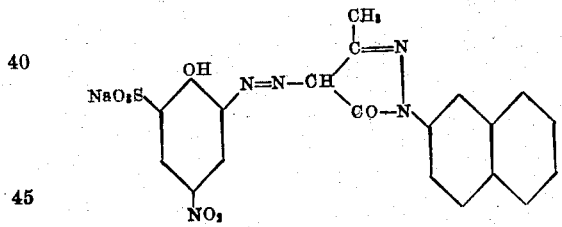

2. A suspension of 22.6 parts of 1-α-naphthyl-3-methyl-5-pyrazolone in 225 parts of water is mixed with 29.5 parts of nitro-naphthalene-1.2-diazoxyde-4-sulphonic acid and there are added whilst stirring, 10 parts of calcined sodium carbonate in form of a solution of 10 per cent strength. The dyestuff is precipitated for the greater part and is finished in the usual manner. The dyestuff has probably the formula

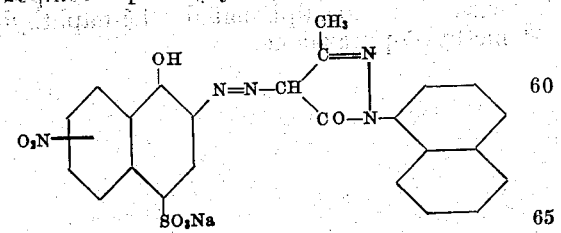

The position of the nitro group is unknown.

3. To a suspension of 22.6 parts of 1-β-naphthyl-3-methyl-5-pyrazolone and 225 parts of water 46.7 parts of the barium salt of naphthalene-1.2-diazoxyde-4.6-disulphonic acid and 10 parts of calcined sodium carbonate are added. The mixture is stirred until the combination is completed. Acetic acid is added and the separated dyestuff is filtered. The chrome-lake of the dyestuff on wool is bluish red. The dyestuff in the form of its free acid has probably the formula

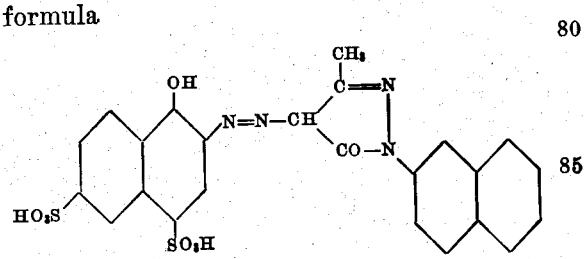

Dyestuffs formed by combining a sulphonated ortho-hydroxydiazo compound with 1. β-naphthyl-3-methyl-5-pyrazolone in the form of their free acids are represented by the general formula:

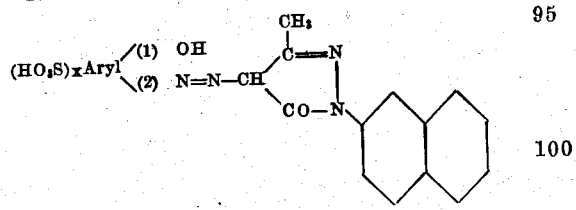

What we claim is,—

1. The herein-described new ortho-hydrozyazo dyes the after-chromed tints of which and those obtained by dyeing in the presence of a chrome-mordant being orange to bluish red and having an excellent fastness to the action of light and to stoving, the dyes being manufactured by combining a sulphonated ortho-hydroxydiazo-compound with an unsulphonated 1-naphthyl-3-methyl-5-pyrazolone.

2. The herein-described new ortho-hydroxyazo dyes the after-chromed tints of which and those obtained by dyeing in the presence of a chrome-mordant being orange to bluish red and having an excellent fastness to the action of light and to stoving, the dyes manufactured by combining a sulphonated ortho-hydroxydiazo compound with an unsulphonated 1.β-naphthyl-3-methyl-5-pyrazolone.

3. The herein-described new ortho-hydroxyazo dyes the after-chromed tints of which and those obtained by dyeing in the presence of a chrome-mordant being orange to bluish red and having an excellent fastness to the action of light and of stoving, the dyes being manufactured by combining a sulphonated ortho-hydroxydiazo compound with 1.β-napththyl-3-methyl-5-pyrazolone.

In testimony whereof we affix our signatures.

Dr. Phil. OSKAR KALTWASSER.
Dr. Ph. Ing. HERMANN KIRCHHOFF.
HANS OEHRN.